United States Patent
Kensrue

(10) Patent No.: US 7,034,250 B2
(45) Date of Patent: Apr. 25, 2006

(54) WELDING WIRE DISPENSING ASSEMBLY AND APPARATUS FOR PROVIDING ADJUSTMENT OF ROTATIONAL RESISTANCE IN A SPOOL

(76) Inventor: Milo M. Kensrue, 1073 Granville Dr., Newport Beach, CA (US) 92660

( * ) Notice: Subject to any disclaimer, the term of this patent is extended or adjusted under 35 U.S.C. 154(b) by 339 days.

(21) Appl. No.: 10/403,793

(22) Filed: Mar. 28, 2003

(65) Prior Publication Data

US 2004/0200819 A1    Oct. 14, 2004

(51) Int. Cl.
B23K 9/12   (2006.01)
B65H 49/00  (2006.01)
B65H 77/00  (2006.01)

(52) U.S. Cl. ............... 219/137.7; 242/423.1; 242/597.5

(58) Field of Classification Search ......... 219/137.7; 242/421, 423.1, 597.5, 597.8
See application file for complete search history.

(56) References Cited

U.S. PATENT DOCUMENTS

| | | | |
|---|---|---|---|
| 3,143,633 A | 8/1964 | Wadleigh | 219/137.2 |
| 3,395,308 A | 7/1968 | Meyer | 314/68 |
| 3,562,577 A | 2/1971 | Kensrue | 314/71 |
| 3,738,588 A | 6/1973 | Ayers | 242/423.1 |
| 4,072,828 A | 2/1978 | Thome | 219/137.31 |
| 4,885,453 A | 12/1989 | Martin | 219/136 |
| 4,954,690 A | 9/1990 | Kensrue | 219/137.31 |
| D329,179 S | 9/1992 | Kensrue | D8/30 |
| 5,725,175 A | 3/1998 | Thundathil | 242/423.2 |
| 6,064,036 A | 5/2000 | Kensrue | 219/137.2 |
| 6,478,246 B1 | 11/2002 | Fahringer | 242/423.2 |
| 6,568,578 B1 * | 5/2003 | Kensrue | 226/176 |

* cited by examiner

Primary Examiner—Kevin P. Kerns
(74) Attorney, Agent, or Firm—Knobbe Martens Olson & Bear, LLP

(57) ABSTRACT

A welding wire dispensing assembly and apparatus for providing adjustment of rotational resistance in a spool includes a spool support, an axle assembly, and a resistance adjustment assembly. The spool support is rotatably mounted to the welding wire dispensing assembly. The spool support has a first end and a second end and defines between the first end and the second end a surface around which a wire spool can be mounted. The axle assembly includes an axle and a first friction member with a friction surface. The resistance adjustment assembly includes a second friction member, a force actuator, and a cam mechanism. Either the first friction member or the second friction member is substantially fixed with respect to either the spool support or the axle. The force actuator is adjustable between two positions. In a first position, the force actuator exerts a first level of interface force on one the first friction member or the second friction member, creating a first level of friction force between the first friction surface and the second friction surface. In a second position, the force actuator exerts a second level of interface force on one of the first friction member and the second friction member creating a second level of friction force between the first friction surface and the second friction surface. The cam mechanism includes a cam channel and a cam follower. The cam follower is movable between a first stop and a second stop. Movement of the cam follower to a first location in the cam channel causes the cam mechanism to at least indirectly exert a force on the force actuator to move the force actuator to the first position, and movement of the cam follower to a second location in the cam channel causes the cam mechanism to at least indirectly exert a force on the force actuator to move the force actuator to the second position.

26 Claims, 8 Drawing Sheets

WELDING WIRE DISPENSING ASSEMBLY AND APPARATUS FOR PROVIDING ADJUSTMENT OF ROTATIONAL RESISTANCE IN A SPOOL

BACKGROUND OF THE INVENTION

1. Field of the Invention

The invention relates to a mechanism for providing and adjusting rotational resistance in a spool and more particularly to a welding wire dispensing assembly and apparatus for retarding the rotation of a filler wire spool used to feed filler material to a welding torch such as an arc welding head or gun.

2. Description of the Related Art

In certain welding processes, a filler material, in the form of a coiled wire, such as steel or aluminum wire, is fed to a welding machine such as an arc welding gun. The wire filler material is typically fed to the welding site by motor driven rollers carried by the welding gun or by rollers mounted in a remote cabinet or both. During this feeding process, the level of tension on the wire should be regulated as the level of tension on the wire affects the column strength of the wire. Typically, a frictional drag force is applied to the wire spool in order to create the proper amount of rotational resistance in the spool and the proper amount of tension in the wire. Typically, the frictional drag force is created (1) between a spindle, rotatably mounted with the spool and a stationary axle member or (2) between a spring biased torsion arm and a rim of the spool.

In welding wire support assemblies, the degree of frictional drag provided must frequently be adjusted. Welding wire support assemblies typically may hold wires made of one of many types of material, including steel, aluminum, and other materials. These materials have differing densities and, as such, have differing levels of inertia. Thus, for different wires, the rotational resistance needed to create the proper tension in the wire may be different.

Typically, in devices relying on creating a frictional drag force, the frictional drag force is increased or decreased by rotating a nut about a bolt. In this way, more or less pressure is applied to a frictional pad such as a fabric washer. This prior art is inaccurate and inconsistent, because there exists no easily calculable method for determining when the appropriate setting has been achieved. Furthermore, methods for operating this prior art allow for too much operator error. Many operators adjust rotational resistance by sight, and rely on a trial and error method if their first estimate is incorrect. Other operators rotate the nut until it is as tight as possible, and then rotate the nut in the opposite direction a specified number of rotations based on the type of wire on the spool. For example, an operator may rotate the nut three rotations for one type of wire and five rotations for another type of wire. This method is subject to operator error and produces unpredictable and inaccurate results because no mechanism exists to indicate when the correct adjustment level is achieved.

SUMMARY OF THE INVENTION

Thus, there exists a need for a welding wire dispensing assembly including an apparatus for quickly adjusting the rotational inertia provided by a spool in which the proper setting is easily detectable, is accurate, and is consistent. Described herein is a welding wire dispensing assembly that accomplishes those objectives.

One aspect of the described welding wire dispensing assembly is a welding wire dispensing assembly comprising a spool support rotatably mounted to the welding wire dispensing assembly. The spool support has a first end and a second end and defines between the first end and the second end a surface around which a wire spool can be mounted. The welding wire dispensing assembly further has an axle assembly including an axle and a first friction member with a friction surface. The welding wire dispensing assembly further has a resistance adjustment assembly comprising a second friction member, a force actuator, and a cam mechanism. Either the first friction member or the second friction member is substantially fixed with respect to either the spool support or the axle. The force actuator is adjustable between two positions. In a first position, the force actuator exerts a first level of interface force on one the first friction member or the second friction member, creating a first level of friction force between said first friction surface and said second friction surface. In a second position, the force actuator exerts a second level of interface force on one of the first friction member and the second friction member creating a second level of friction force between the first friction surface and the second friction surface. The cam mechanism comprises a cam channel and a cam follower. The cam follower is movable between a first stop and a second stop. Movement of the cam follower to a first location in the cam channel causes the cam mechanism to at least indirectly exert a force on the force actuator to move the force actuator to the first position, and movement of the cam follower to a second location in the cam channel causes the cam mechanism to at least indirectly exert a force on the force actuator to move the force actuator to the second position.

Another aspect of the welding wire dispensing assembly is that the force actuator or the cam mechanism may prevent the force actuator from moving in at least one direction beyond the first position. Similarly, either the force actuator or the cam mechanism prevents the force actuator from moving in at least one direction beyond the second position.

Another aspect of the welding wire dispensing assembly is that the cam follower may be movable in opposite directions to move the force actuator between the first position and the second position.

Another aspect of the welding wire dispensing assembly is that the first level of friction force is greater than the second level of the friction force.

Another aspect of the welding wire dispensing assembly is that the welding wire dispensing assembly may further comprise a spool retainer releasably securable to the first end of the spool support. The spool retainer has a surface configured to cooperate with the spool support to prevent a spool from sliding off the first end of the spool support.

Another aspect of the welding wire dispensing assembly is that the welding wire dispensing assembly may further comprise a spool retainer releasably securable to the first end of the spool support. The spool retainer has a surface configured to cooperate with the spool support to prevent a spool from sliding off the first end of the spool support. The spool retainer further defines a gripping surface configured to at least indirectly exert force on the cam mechanism to move the cam follower so that the cam mechanism at least indirectly causes the movement of the force actuator between the first position and the second position.

Another aspect of the welding wire dispensing assembly is that the retainer may further define a finger gripping surface configured to facilitate rotation of the retainer by fingers of a user.

Another aspect of the welding wire dispensing assembly is that the retainer may further comprise visual indicia indicating the direction the retainer is to be moved to obtain the desired level of resistance when a spool of a given type of wire is mounted on the spool support.

Another aspect of the welding wire dispensing assembly is that the welding wire dispensing assembly may comprise a frame, a spool support, an axle assembly, and a resistance adjustment assembly. The spool support has a first end and a second end and defines between the first end and the second end a surface around which a wire spool can be mounted. The axle assembly includes an axle and a first friction member with a friction surface. The resistance adjustment assembly comprises a second friction member, a force actuator, and a control. Either the first friction member or the second friction member is substantially fixed with respect to either the spool support or the axle. The force actuator is adjustable between two positions. In a first position, the force actuator exerts a first level of interface force on one the first friction member or the second friction member, creating a first level of friction force between said first friction surface and said second friction surface. In a second position, the force actuator exerts a second level of interface force on one of the first friction member and the second friction member creating a second level of friction force between the first friction surface and the second friction surface. The control defines a second adjustment surface. The force actuator is movable between the first position and the second position in response to interaction between the first adjustment surface and the second adjustment surface. Movement of the force actuator in at least one direction from said first position is subject to greater resistance than movement in the at least one direction toward the first position and movement of the force actuator in at least one direction from the second position is subject to greater resistance than movement in the at least one direction toward the second position.

Another aspect of the welding wire dispensing assembly is that at least one of the force actuator and the control may prevent the force actuator from moving in at least one direction beyond the first position and at least one of the force actuator and the control may prevent the force actuator from moving in at least one direction beyond the second position.

Another aspect of the welding wire dispensing assembly is that the control may be movable in opposite directions to move the force actuator between the first position and the second position.

Another aspect of the welding wire dispensing assembly is that the first level of friction force may be greater than the second level of friction force.

Another aspect of the welding wire dispensing assembly is that the welding wire dispensing assembly may further comprise a spool retainer releasably securable to the first end of the spool support. The spool retainer has a surface configured to cooperate with the spool support to prevent a spool from sliding off the first end of the spool support.

Another aspect of the welding wire dispensing assembly is that the control may define a manipulation surface configured to be gripped to move the control so that the first adjustment surface and the second adjustment surface interact to move the force actuator between the first position and the second position.

Another aspect of the welding wire dispensing assembly is that the welding wire dispensing assembly may further comprise a spool retainer releasably securable to the first end of said spool support. The spool retainer has a surface configured to cooperate with the spool support to prevent a spool from sliding off the first end of the spool support. The spool retainer further defines a gripping surface configured to exert force on the manipulation surface of the control to move the control so that the first adjustment surface and the second adjustment surface interact to move the force actuator between the first position and the second position.

Another aspect of the welding wire dispensing assembly is that the retainer may further define a finger gripping surface configured to facilitate rotation of said retainer by fingers of a user.

Another aspect of the welding wire dispensing assembly is that the retainer may further comprise visual indicia indicating the direction the retainer is to be moved to obtain the desired level of resistance when a spool of a given type or size of wire is mounted on the spool support.

Another aspect of the welding wire dispensing assembly is that either the force actuator or the control may define a cam surface which cooperates with a cam follower on the other of the force actuator and the control to move the force actuator from one of the first position and the second position to the other of the first position and the second position.

Another aspect of the welding wire dispensing assembly is a welding wire dispensing assembly comprising a frame, a spool support, and an adjustment assembly. The spool support is rotatably mounted to the frame and has a first end and a second end. The spool support defines between the first end and the second end a surface around which a wire spool can be mounted. The resistance adjustment assembly comprises a force actuator and a spool retainer. The force actuator has a first adjustment surface, a first position configured to cause a first level of resistance, and a second position configured to cause a second level of resistance. The spool retainer is releasably securable to the first end of the spool support. The spool retainer has a surface configured to cooperate with the spool support to prevent a spool from sliding off the first end of the spool support. The spool retainer further defines a gripping surface configured to interact at least indirectly with the force actuator to cause the force actuator to assume either the first position or the second position.

Another aspect of the welding wire dispensing assembly is that the spool retainer may further provide a first mode of operation to cause the force actuator to assume the first position and a second mode of operation to cause the force actuator to assume the second position.

Another aspect of the welding wire dispensing assembly is that the spool retainer may further provide visual indicia illustrating the first mode of operation and the second mode of operation.

Another aspect of the welding wire dispensing assembly is that the first mode of operation may be rotating the spool retainer in either a clockwise direction or a counter-clockwise direction. The second mode of operation may be rotating the spool retainer in the opposite direction.

Another aspect of the welding wire dispensing assembly is a welding wire dispensing assembly comprising a frame, a spool support, a resistance adjustment assembly, and a tool. The spool support is rotatably mounted to the frame and has a first end and a second end. The spool support defines between the first end and the second end a surface around which a wire spool can be mounted. The resistance adjustment assembly comprises a force actuation having a first adjustment surface. The force actuator has a first position configured to cause a first level of resistance, and a second position configured to cause a second level of resistance.

The tool defines a gripping surface configured to interact at least indirectly with the first adjustment surface of the force actuator to cause the force actuator to assume either the first position or the second position. The tool is rotatable in one direction to cause the force actuator to assume the first position and rotatable in an opposite direction to cause the force actuator to assume the second position. The tool includes visual indicia indicating the direction the tool is to be moved to obtain the desired level of resistance when a spool of a given type of wire is mounted on the spool support.

Another aspect of the welding wire dispensing assembly is that the tool may be integrally formed into a component of the welding wire dispensing assembly.

Another aspect of the welding wire dispensing assembly is that the tool may be attached to a component of the welding wire dispensing assembly.

These and other aspects of the welding wire dispensing assembly are herein described in more detail with reference to the following drawings.

DETAILED DESCRIPTION OF THE PREFERRED EMBODIMENT

Figure 1:
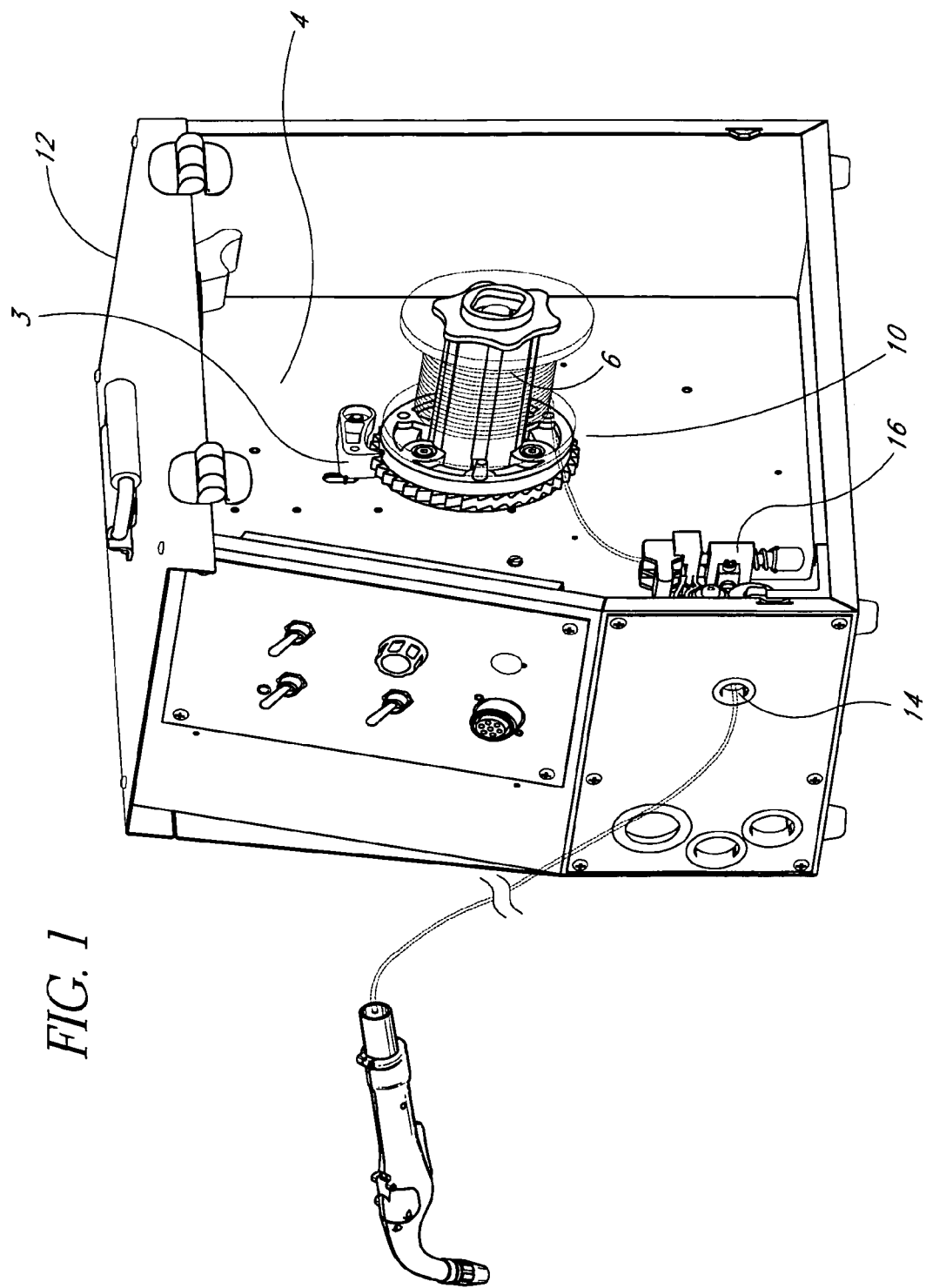
FIG. 1 illustrates one embodiment of a welding wire dispensing assembly with an attached welding wire support assembly.

FIG. 1 illustrates one embodiment of a welding wire dispensing assembly including a welding wire support assembly 10 upon which a welding wire spool is mounted. As illustrated, the welding wire support assembly 10 is located within a cabinet 12. The support assembly has a proximal end adjacent to an inner wall 4 of the cabinet 12 to which the assembly is mounted and a distal end opposite the proximal end. Thus, the cabinet forms a frame for supporting the support assembly. During use of the welding device, wire wrapped around the spool (shown in phantom) is unrolled and fed through an opening 14 in the cabinet 12 by a first wire feed mechanism 16 mounted in the cabinet and a second wire feed mechanism which forms a part of a welding gun.

Alternatively, the welding wire dispensing assembly may be a welding gun that defines a frame for mounting the welding wire support assembly 10. For example, the welding wire dispensing assembly may be a welding gun as portrayed in U.S. Pat. No. 6,064,036, entitled "WELDING GUN FILLER WIRE SPOOL BRAKE AND WIRE POSITION REGULATOR," issued May 16, 2000. Typically, a welding gun with a welding wire support assembly 10 has a proximal end and a distal end. During use of the welding gun, wire wrapped around the spool is unrolled and fed through the proximal tip of the welding gun.

One of ordinary skill in the art will appreciate that many of the inventive aspects described herein relate to the welding wire support assembly 10 itself. As such, the welding wire dispensing assembly upon which the welding wire support assembly 10 is mounted may be modified without eliminating many of the inventive aspects of the welding wire support assembly 10. The Claims cover any welding wire support assembly 10 as described in the Claims regardless of the type of welding wire dispensing assembly upon which the welding wire support assembly 10 is mounted, whether the welding wire dispensing assembly is a welding cabinet as shown in FIG. 1, a welding gun, or another type of welding wire dispensing assembly.

Structure of the Welding Wire Support Assembly

Figure 2:
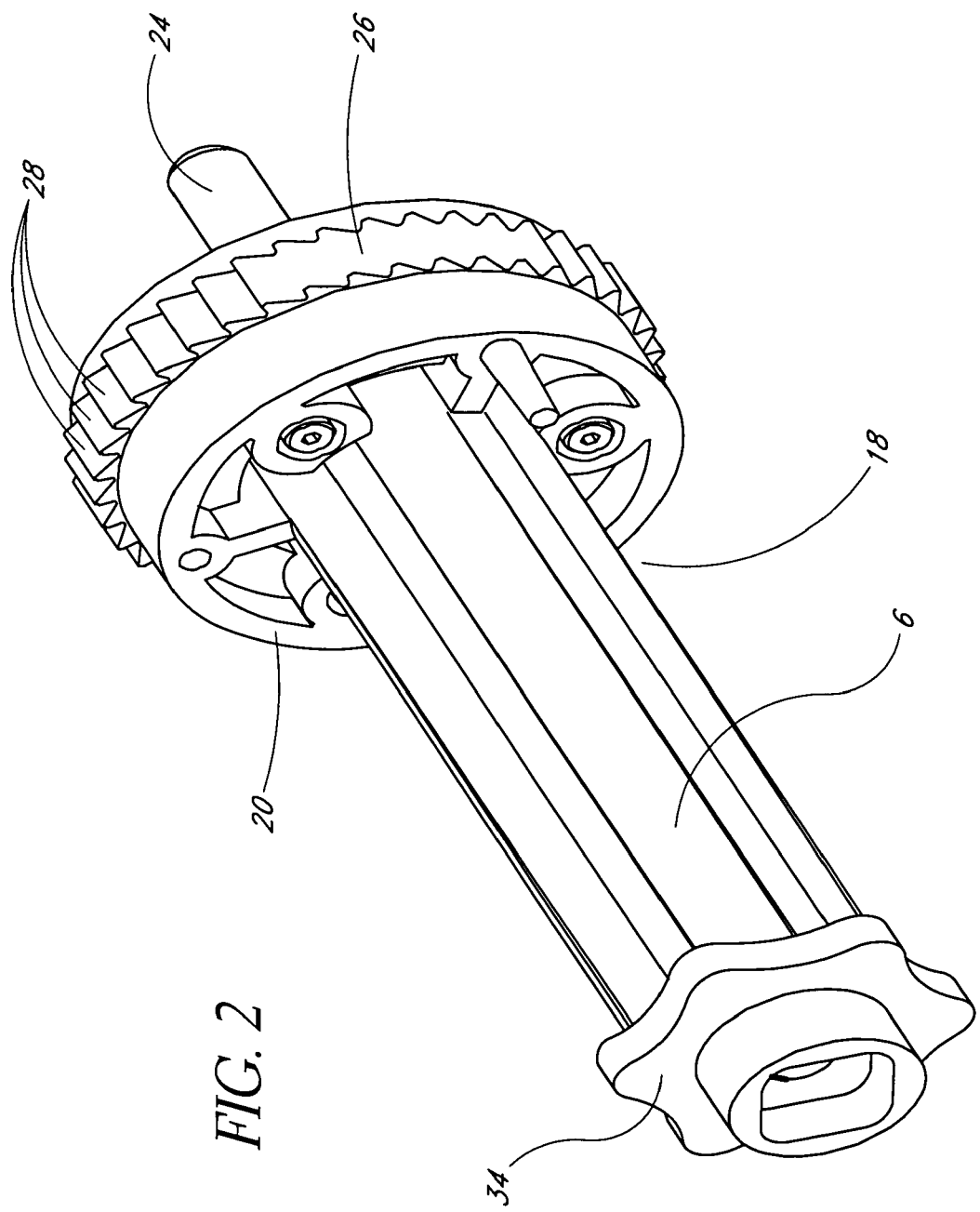
FIG. 2 is an external view of an assembled welding wire support assembly.
Figure 3:
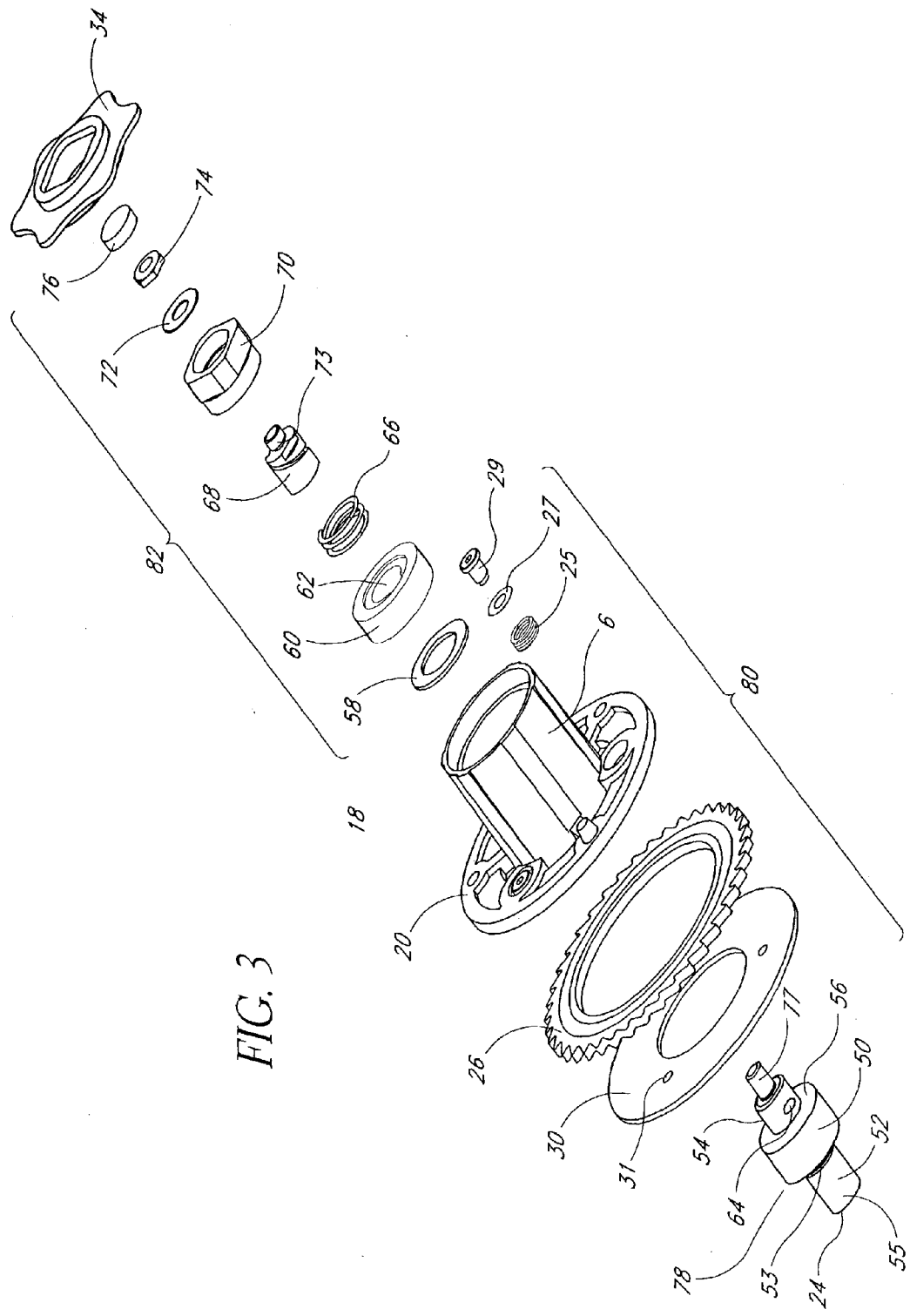
FIG. 3 is an exploded view of the components of the welding wire support assembly.

FIGS. 2 and 3 illustrate the welding wire support assembly 10. The welding wire support assembly 10 includes an axle assembly 78, a support or spindle assembly 80 that receives and retains the spool, and a rotational resistance assembly 82.

The Spindle Assembly

The spindle assembly 80 comprises a spindle 18, a plate back up ring 30, a brake disk 26, and a retainer 34. The spindle comprises a generally disc-shaped face plate 20 and a generally cylindrical body 6. The retainer 34 is detachably attached to the distal end of the spindle 18 for securing the spool to the spindle 18. The body 6 defines a series of generally cylindrical support surfaces which cooperate with a mating cylindrical surface defined by the central inner wall of the wire spool. Though this series of generally cylindrical support surfaces need not be cylindrical, it is desirable that the surfaces cooperate with the inner wall of the spool so that the spool is secured so as to rotate in unison with the spindle. Alternatively, the retainer 34 and face plate 20 may be spaced to provide pressure on the spool sufficient to secure the spool so as to rotate in unison with the spindle. An axle 24, described in more detail below, protrudes from the proximal end of the spindle 18. Abutting the face plate 20 of the spindle 18 is a brake disk 26. A number of brake teeth 28 encircle the circumference of the brake disk 26. The brake teeth 28 are adapted to receive a pawl 3 (FIG. 1), providing a means to brake the rotation of the welding wire support assembly 10. Abutting the brake disk 26 is a plate back up ring 30. In one embodiment, the face plate 20, the brake disk 26, and the plate back up ring 30 are secured to each other with springs 25, washers 27, and screws 29. In one embodiment, three sets of springs 25, washers 27, and screws 29 are provided. The screws 29 extend through the washers 27, springs 25, face plate 20, and brake disk 26, and are received by holes 31 in the plate back up ring 30. Alternatively, a different type and/or number of fasteners may be provided. In one preferred embodiment, a retainer 34 threadably attaches to the spindle 18 at the end opposite the face plate 20. Alternatively, the retainer 34 may attach to the spindle 18 in another fashion, such as by providing on the retainer 34 a series of protrusions that snap into notches provided on distal end of the spindle 18. Any manner of detachably securing the retainer 34 is within the scope of the inventive aspect.

The Axle Assembly

The axle assembly 78 comprises the axle 24, and a bearing assembly 50. The axle 24 includes a proximal portion 52, a distal portion 54, and an internal portion 53 that runs between the proximal portion 52 and the distal portion 54. Located starting at the proximal portion 52 is a shaft 55. The shaft may be approximately 4.5" long and may have an approximate diameter of 0.625". Located at the distal portion 54 is a smaller diameter connector section such as an externally threaded shaft 77. The threaded connector section 77 may extend internally into the shaft 55, and protrudes from the shaft 55. The protruding portion of the connector section may have a length of approximately 1.125" and a diameter of approximately 0.25". The bearing assembly 50 is desirably cylindrical, and may have a length of approximately 1.5" and a diameter of approximately 1". The bearing assembly 50 includes an exposed planar annular friction surface, or rim 56, and a series of internal ball bearings arranged so as to encircle the axle 24. While other types of friction surfaces are possible, the planar annular rim 56 is desirable because it permits the apparatus to utilize an off the shelf bearing and is easily manufactured to the desired tolerance. In one embodiment, dual radial single race ball bearings are used. Any type of bearing may be used that effectively reduces friction between the bearing assembly 50 and the axle 24.

The axle 24 extends through the bearing assembly 50. The proximal portion 52 of the axle 24 protrudes from the bearing assembly 50 and is secured to the wall 4 of the cabinet 12. Desirably, the proximal portion 52 of the axle 24 is fixedly secured to the cabinet 12 such that the axle 24 does not rotate. In this embodiment, the bearing assembly 50 rotates about the axle 24. Alternatively, the bearing assembly 50 may be fixed against rotation and the axle 24 may rotate with respect to the bearing assembly 50. The internal portion 53 of the axle 24 is inside the bearing assembly 50. The internal bearings encircle the internal portion 53 of the axle 24, enabling the rotation of the axle 24 in relation to the bearing assembly 50 or the rotation of the bearing assembly 50 relative the axle 24. The distal portion 54 of the axle 24 protrudes from the bearing assembly 50 on the opposite side of the proximal portion 52. The distal portion 54 of the axle 24 includes a radially extending protrusion.

The Rotational Resistance Assembly

The rotational resistance assembly 82 comprises a leather washer 58, a spacer 60, a spring 66, a cam 68, and a tension knob 70. The compressability of the leather washer 58 provides a degree of friction between the leather washer 58 and any surfaces that it contacts. Alternatively, any number of compressable materials or materials that provide a similar degree of friction may be used, such as, for example, fabric or rubber. The leather washer 58 abuts the spacer 60. Formed into an inner wall of the spacer 60 is a notch 62 sized and shaped to receive and retain the protrusion. The distal end of the spacer forms an annular spring seat. The spring 66 abuts the spring seat of the spacer 60. The cam 68, has a cam barrel 67, a cam channel or cam groove 69, a bore 71 and a cam threaded shaft 73. The cam 68 is received into the tension knob 70. The bore is located at the proximal or bore end of the cam barrel 67 receives the threaded shaft 77 of the axle 24. Opposite the bore end is a distal thread end, ending in the cam threaded shaft 73. The diameter of the cam barrel 67 may be approximately 0.625". The length of the cam barrel may be approximately 1.5". Integrally formed into the cam barrel 67 at the thread end is the cam threaded shaft 73, adapted to receive a hex nut 74. The cam groove 69 is formed into the outer cylindrical wall of the cam barrel 67 and has a head at its proximal end and a tail 93 at its distal end. The head 91 may be located approximately 0.5" from the bore end. The head 91 has three walls, configured such that a pin 90 (FIG. 4) received into the cam groove 69 is allowed to slide only toward the tail 93. The head 91 may extend for approximately 0.125", aligned generally perpendicular to the axis of the cam barrel 67. The tail 93 extends from the head 91 to the thread end at an approximately 45° angle to the head 91 and the axis of the cam barrel 67. The length of the tail 93 along the perimeter of the cam barrel 67 may be approximately 1.25". The tail 93 has two walls, configured such that a pin 90 (FIG. 4) received into the cam groove 69 is allowed to slide either toward the head 91 or away from the head 91. The tail 93 is open at the thread end, such that a pin 90 (FIG. 4) received into the cam groove 69 is not restrained, by the groove walls, from leaving the cam groove 69. The depth of the cam groove 69 may be approximately 0.1". The walls of the cam groove 69 are aligned generally perpendicular to the surface of the cam barrel 67.

The tension knob 70 has a cylindrical proximal portion 95 and a polygonal gripping portion 97 through which axially extend an inner bore. The proximal portion 95 may have a length of approximately 0.5" and a diameter of approximately 1.0". Embedded in the wall of the proximal portion 95 is a cam follower or pin 90 (FIG. 4) approximately 0.125" in diameter. A portion of the pin 90 (FIG. 4) extends radially inward into the bore of the proximal portion 95 a distance slightly smaller than the depth of the cam groove 69. Thus, when the pin 90 is received into the cam groove 69, the pin 90 may slide freely along the cam groove 69 without scraping the floor of the cam groove 69. The gripping portion 97 may have a length of approximately 0.875". When the cam follower or pin 90 is received into the cam channel or cam groove 69; a cam mechanism comprising the cam follower or pin 90 and the cam channel or cam groove 69 is formed. As is described in more detail, in one embodiment the cam mechanism participates in the selection of a rotational resistance level.

The gripping portion 97 generally defines a square having chamferred corners on its outside perimeter. The bore extending through the tension knob has a first proximal larger diameter portion and a second distal smaller diameter portion which cooperate to form a radially extending annular shoulder there between. The gripping portion 97 has a first cylindrical inner perimeter having a diameter of approximately 0.75". Approximately 0.5" from the end of the gripping portion 97 that is opposite the cylindrical portion 95, the gripping portion has a second cylindrical inner perimeter having a diameter that is slightly smaller than the diameter of the first cylindrical inner perimeter. Thus, the second cylindrical inner perimeter forms a shoulder 99 inside the second cylindrical inner perimeter. The outside perimeter of the gripping portion 97 has 4 major sides 101 (FIG. 9) and 4 minor sides 103 (FIG. 9), arranged alternatively. The major sides 101 are aligned at approximately 90° angles from each other, and have a length of approximately 0.5". The minor sides 103 are aligned at approximately 90° angles from each other, and approximately 45° angles from the major sides 101, and have a length of approximately 0.375". The length from one major side 101 to its parallel major side 101 is slightly smaller than the diameter of the cylindrical portion. Thus, a small shelf 105 is provided near the end of the gripping portion 97 that is adjacent to the cylindrical portion 95.

The threaded shaft 77 extends through the tension knob 70, a spacer washer 107, a stop or second washer 72, and a fastener or hex nut 74 and is secured by the hex nut 74. The spacer washer 107 and the washer 72 have diameters slightly larger than the diameter of the shoulder 99 formed internally in the tension knob 70. Thus, when the spacer washer 107 and second washer 72 come into contact with the shoulder 99, further forward motion of the cam barrel 67 with respect to the tension knob 70 is prevented. The size of the spacer washer 107, the washer 72, and the tightness of the hex nut 74 determine the precise position of the cam barrel 67 with respect to the tension knob 70 when further motion is prevented. Thus, by altering these parameters, one can adjust one position of the cam barrel 67 with respect to the tension knob 70. A protective cap 76 covers the hex nut 74.

Structural Relationship Among the Three Assemblies

The distal portion 54 of the axle 24 protrudes from the bearing assembly 50 and extends into the center of the body 6 of the spindle 18. An external wall of the bearing assembly 50 is received snugly into an internal wall of the spindle 18 and is secured against rotation relative the spindle 18. Thus, the bearing assembly 50 is secured such that it rotates in concert with the spindle 18. The rim 56 of the axle assembly 78 is within the body 6 of the spindle 18. The distal portion 54 of the axle 24 extends through the leather washer 58, the spacer 60, and the spring 66 of the rotational resistance assembly 82. Thus, the rim 56 of the axle assembly 78 abuts the leather washer 58. The bore 71 of the cam 68 threadably receives the threaded shaft 77 of the axle 24. The notch 62 of the spacer 60 receives the protrusion 64 of the internal portion 53 of the axle assembly 78. Thus, since the axle 24 is fixed, the spacer 60 is likewise fixed against rotation.

Structural Relationship Between the Cam and the Tension Knob

Figure 4:
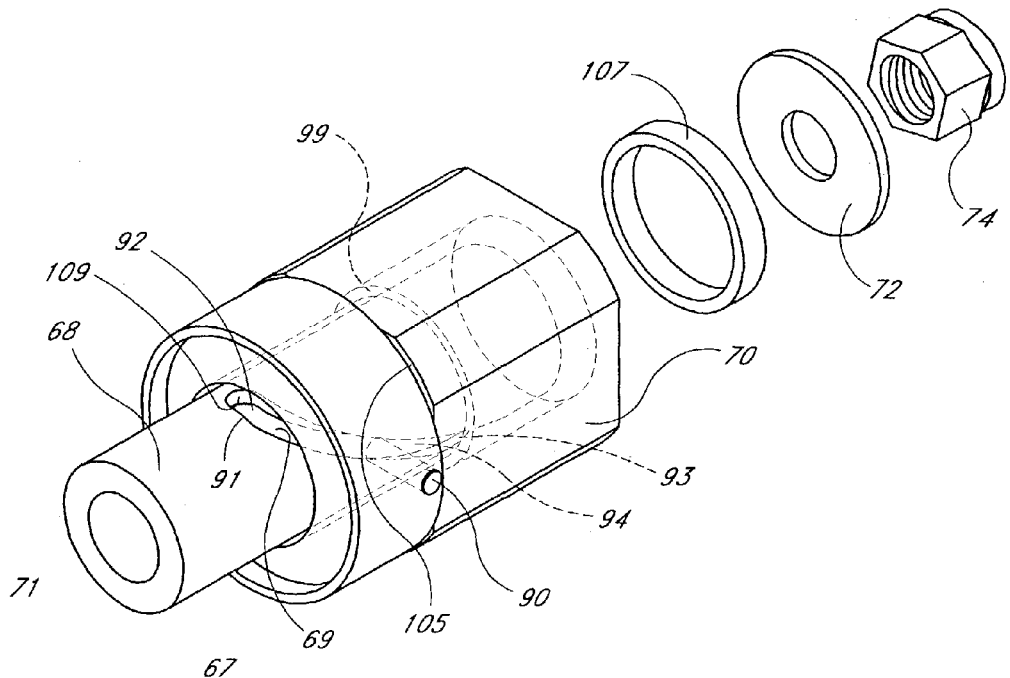
FIG. 4 illustrates one position of a pin within a cam mechanism of the welding wire support assembly.
Figure 5:
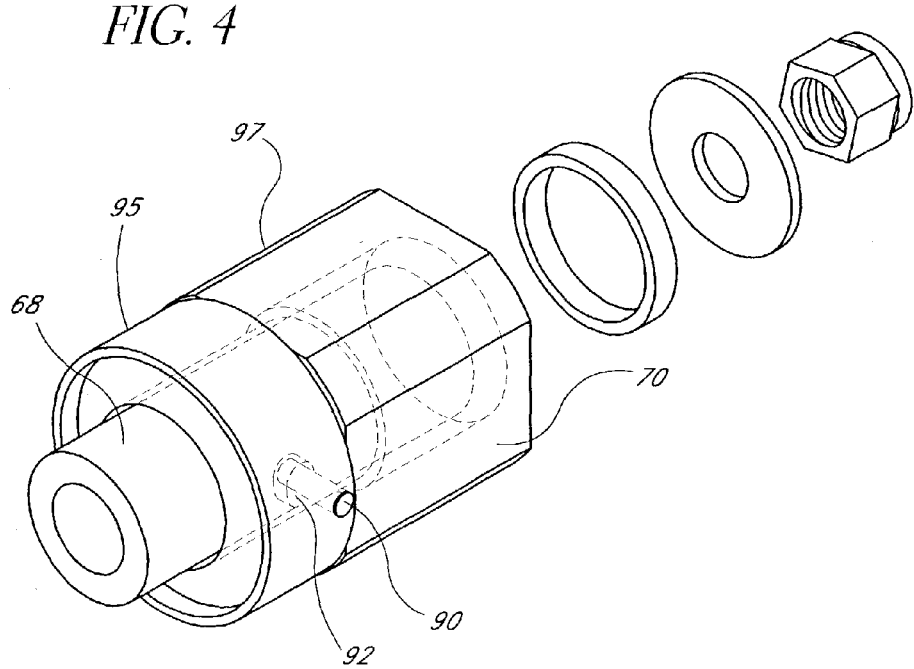
FIG. 5 illustrates another position of a pin within a cam mechanism of a welding wire support assembly.

Referring to FIGS. 4 and 5, formed into the inner wall of the tension knob 70 is a pin 90 that is slidably received into the cam groove 69. The cam groove 69, tension knob 70, spacer washer 107, tension knob washer 72, and tension knob hex nut 74 define a range of motion for the pin 90 along the cam groove 69. The pin 90 may be temporarily located at any position along the cam groove 69. Generally, however, the pin 90 assumes either a proximal or forward position 92 or a distal or backed-off position 94. The two positions are at two lineal distances with respect to the distal end of the cam barrel 67. FIG. 4 illustrates a forward position 92, in which the location of the pin 90 within the cam groove 69 is lineally closer to the edge of the cam barrel 67. A proximal or forward wall 109 of the cam groove 69 prevents the pin 90 from moving axially more forward than the forward wall 109. In one embodiment, when the pin 90 is in the forward position 92, the cam barrel 67 extends 0.375" from the edge of the tension knob 70.

FIG. 5 illustrates a backed-off position 94, in which the location of the pin within the cam 68 is lineally farther away from the distal end of the cam barrel 67. In one embodiment, the internal shoulder 99 of the tension knob 70 contacts the combination of the spacer washer 107, the second washer 72, and the hex nut 74 at the point where the pin has reached the backed-off position 94. In this embodiment, the spacer washer 107, second washer 72, and hex nut 74 combination determines the location of the backed-off position 94 of the pin 90. The pin 90 could be located even farther back if it were not for the restraint imposed by the spacer washer 107, the second washer 72, and the hex nut 74. Thus, a different backed-off position 94 may advantageously be established without replacing the cam 68 by changing the parameters of the spacer washer 107, second washer 72, and hex nut 74 combination. Alternatively, the cam groove 69 may provide a second terminal wall that constrains the movement of pin 90. In one embodiment, when the pin 90 is in the backed-off position 94, the cam barrel 67 extends 0.75" from the edge of the tension knob 70.

Selecting a Rotational Resistance Setting Using the Tension Knob

An operator selects one of two rotational resistance settings by manipulating the tension knob 70 such that the pin 90 assumes either the forward position 92 or the backed-off position 94. The pin 90 assumes the forward position 92 upon a clockwise rotation of the tension knob 70. The pin 90 assumes the backed-off position 94 upon a counter-clockwise rotation of the tension knob 70. Alternatively, the rotational resistance assembly 82 may be configured such that the pin 90 assumes the forward position 92 upon a clockwise rotation of the tension knob 70, and assumes the backed-off position 94 upon a counter-clockwise rotation of the tension knob 70. Preferably, the degree of rotation of the tension knob 70 that is necessary to adjust the resistance setting is less than one full rotation. In one preferred embodiment, a change in resistance level occurs with an approximately one-quarter rotation of the tension knob 70. Alternatively, the rotational resistance assembly 82 may be configured such that smaller or larger degrees of rotation are adequate for adjusting the resistance setting.

The distance that the cam barrel 67 extends from the edge of the tension knob 70 corresponds to a gap between the spacer 60 and the tension knob 70. As will be further explained, the size of this gap determines the degree of friction and thus rotational resistance that is created by the rotational resistance assembly 82. As the gap between the spacer 60 and the tension knob 70 narrows, the spring 66 is compressed. The compression of the spring 66 against the spacer 60 exerts pressure on the spacer 60, the leather washer 58, and the rim 56, respectively. Thus, as the gap between the spacer 60 and the tension knob 70 narrows and the spring 66 becomes more compressed, the frictional drag force exerted on the rim 56 increases, resulting in a higher level of rotational resistance on the spindle 18.

Figure 6:
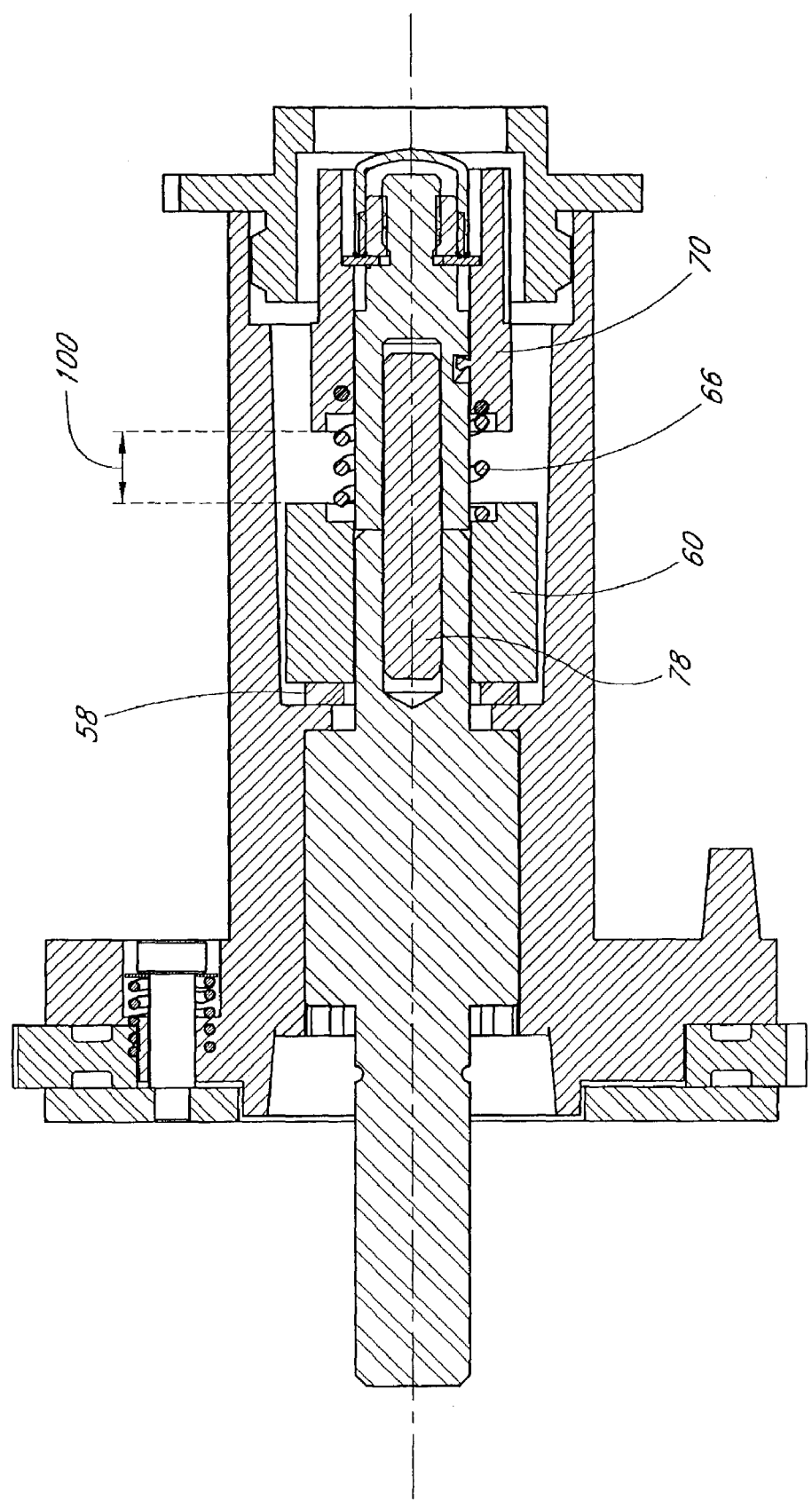
FIG. 6 illustrates the relationship between cam positions, spring compression, and the size of a gap between a spacer and a tension knob when the tension knob is in a backed-off position.
Figure 7:
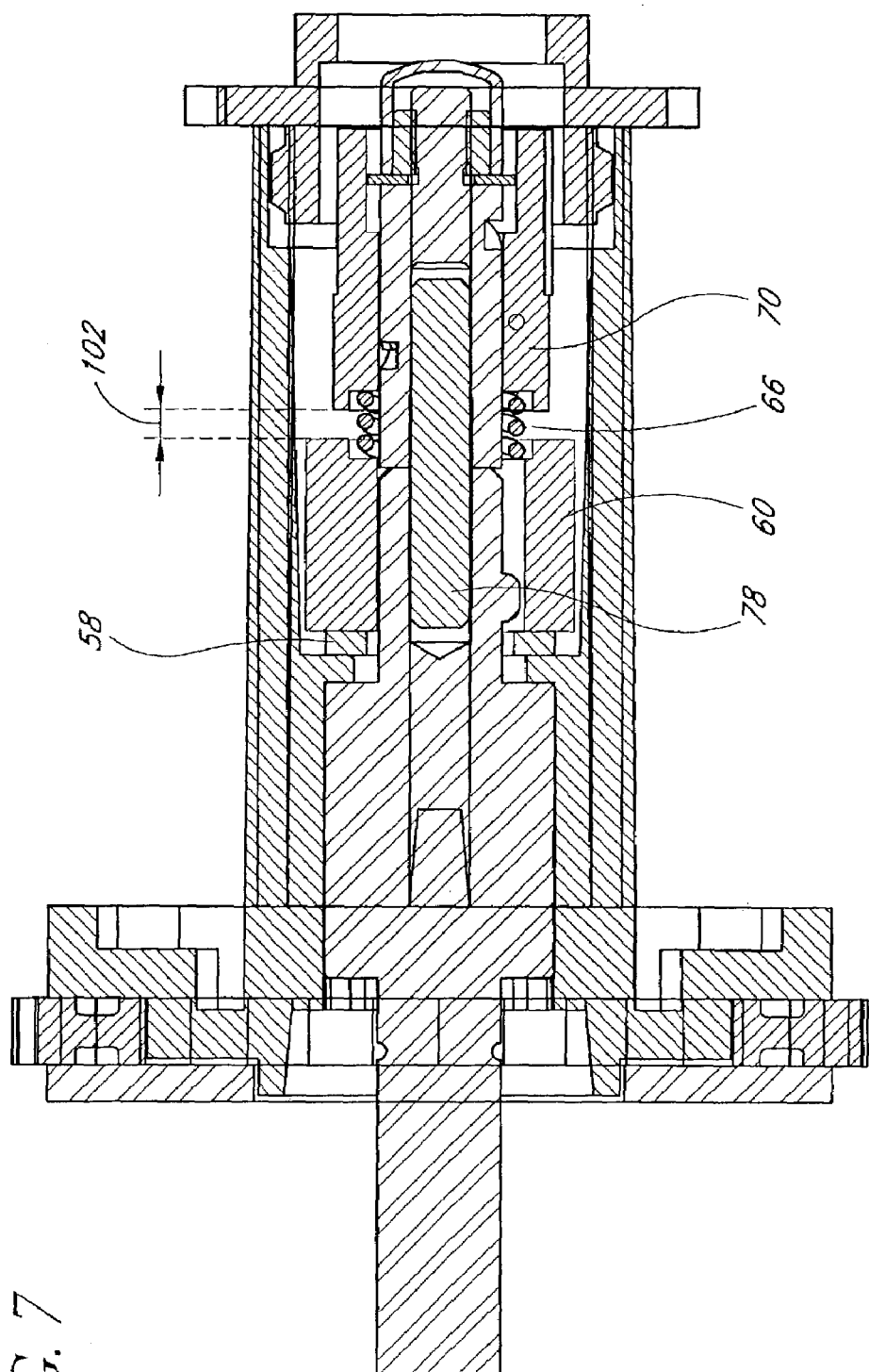
FIG. 7 illustrates the relationship between cam positions, spring compression, and the size of a gap between a spacer and a tension knob when the tension knob is in a forward position.

FIGS. 6 and 7 illustrate the relationship between the cam 68 positions, spring 66 compression, and the size of the gap between spacer 60 and tension knob 70. FIG. 6 depicts this relationship when the tension knob 70 is in the forward position 92 with relation to the cam barrel 67. As previously indicated, when the tension knob 70 is in the forward position 92, the cam barrel 67 protrudes approximately 0.75" from the tension knob 70. Thus, in this embodiment, the forward gap 100 between the spacer 60 and the tension knob 70 is approximately 0.75". Thus, in FIG. 6, the spring 66 is less compressed in this position relative the backed-off position 94 shown in FIG. 7.

FIG. 7 depicts the relationship when the tension knob 70 is in the forward position 92 with relation to the cam barrel 67. As previously indicated, when the tension knob 70 is in the forward position 92, the cam barrel 67 protrudes approximately 0.375" from the tension knob 70. Since the gap between the spacer 60 and the tension knob 70 is approximately the length of the protruding portion of the cam barrel 67, the backed-off gap 102 between the spacer 60 and the tension knob 70 is approximately 0.375". Thus, in FIG. 7, the spring 66 is compressed.

The differences in spring 66 compression caused by the differing gaps between spacer 60 and tension knob 70 result in differing levels of rotational resistance on the spindle 18. The characteristics of the leather washer 58, spring 66, tension knob 70, and cam 68, are known. Furthermore, the two terminal positions 92 and 94 of the pin 90 (FIG. 4) consistently produce gaps between the spacer 60 and the tension knob 70 that are of known dimension. Advantageously, because all of these parameters are known, the rotational resistance at each of the two positions 92 and 94 of the tension knob 70 is calculable.

Additionally, as illustrated in FIGS. 4 and 5, once the pin 90 reaches one of the two terminal positions 92 and 94, the pin 90 is constrained such that it can only move toward the other terminal position. Thus, an operator is prevented from rotating the tension knob 70 too much, eliminating or reducing the potential for operator error. Furthermore, an operator may easily detect when the desired location has been reached. Therefore, unlike prior art devices using a frictional drag force, the use of the cam 68 enables an operator to reliably, repeatably, and accurately choose between two rotational resistance settings.

Advantageously, the cam 68 also may enable an operator to adjust the rotational resistance of the spool with a nominal rotation of the tension knob 70. As previously indicated, prior art rotational resistance adjustment mechanisms require an operator to rotate a nut about a bolt a number of rotations. The cam 68, however, provides a nearly immediate displacement upon rotating the tension knob 70 enough to cause the tension knob 70 to switch from the forward position 92 to the backed-off position 94, or vice-versa. In one preferred embodiment, the adjustment may be performed by an approximately one-quarter rotation of the tension knob 70.

Furthermore, the cam 68 of the present invention enables one of ordinary skill in the art to design a spool mechanism that can reliably provide any two arbitrary levels of rotational resistance. Different rotational resistance settings can be designed into a device by changing the characteristics of the spring 66, the cam 68, the tension knob 70 or other components. In one preferred embodiment, a setting for aluminum, and a setting for steel and other heavier metals are provided. For this embodiment, it has been determined that the characteristics and dimensions of the cam 68 previously described are advantageous. Additionally, it has been determined that the spring 66 advantageously may be composed of music wire, have an outside diameter of 0.85", have an inside diameter of 0.69", have a free length of 0.75", have a rate of 67 pounds/inch, have a maximum deflection of 0.43", have a maximum load of 29 pounds, have a solid height of 0.31", have a wire diameter of 0.080", and have 3.88 total coils. With these characteristics of a preferred embodiment, it has been determined that between 0.75 and 1.25 pounds of torque turn the axle 24 when the tension knob 70 is in the backed-off position 94 relative the cam 68. It has been determined that between 2.5 and 3.5 pounds of torque turn the axle 24 when the tension knob 70 is in the forward position 92 relative the cam barrel 67. These parameters have been determined to be adequate for typical aluminum and steel wire. Alternative parameters may be chosen and remain within the scope of the invention as described.

An Integral Tension Knob Adjustment Tool

Figure 8:
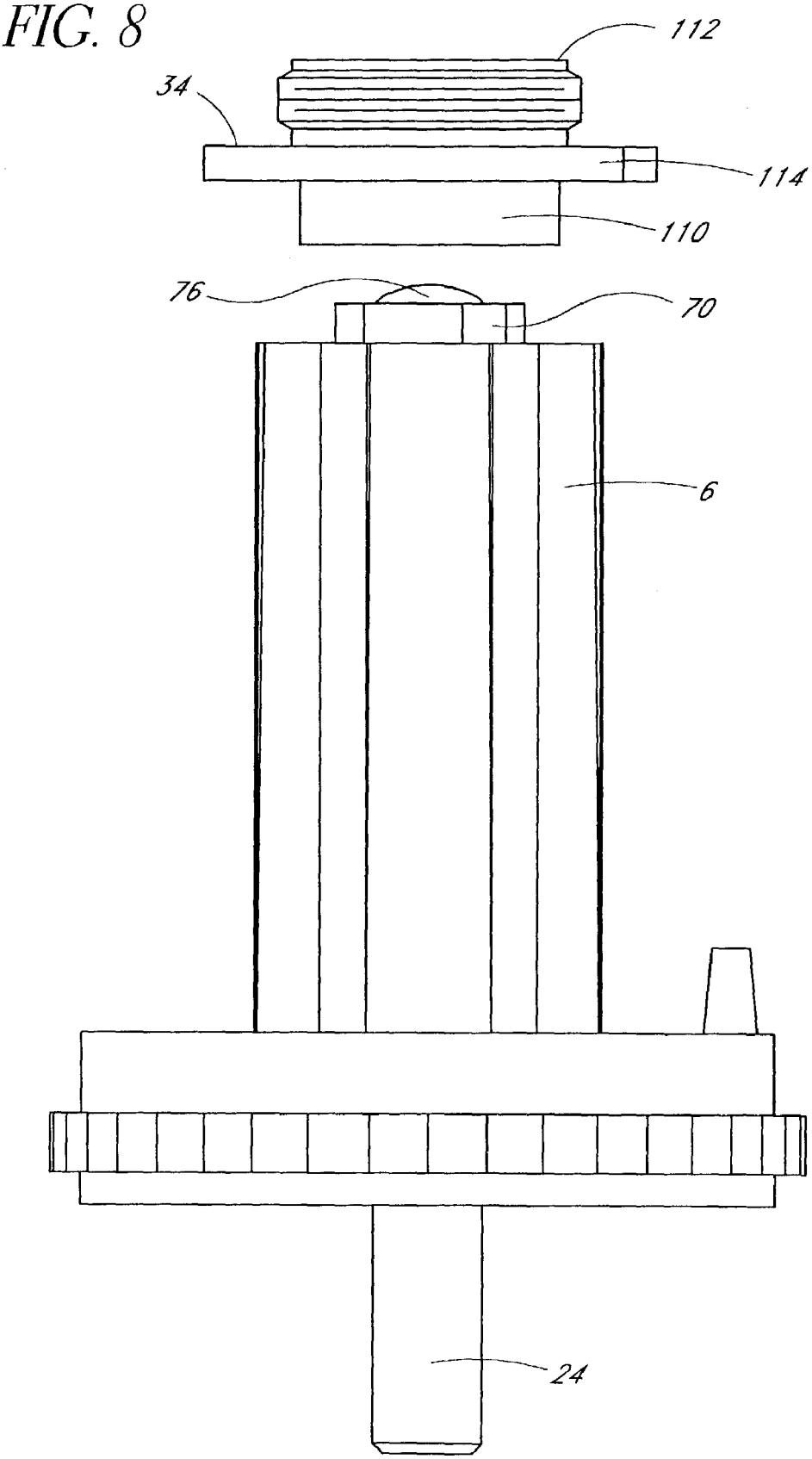
FIG. 8 illustrates an advantageous embodiment in which a tension knob adjustment tool is integrally formed into the welding wire support assembly.

FIG. 8 illustrates an advantageous embodiment in which a tension knob adjustment tool is integrally formed into the welding wire support assembly 10. In a preferred embodiment, retainer 34 doubles as the tension knob adjustment tool 110 when detached from the end of the spindle 18. As illustrated, one side of the retainer 34 provides external threads 112 that mate with internal threads in the distal end of the body 6 of the spindle 18 to enable the retainer 34 to perform one function of holding wire on the welding wire support assembly 10. The other side of the retainer 34 is the tension knob adjustment tool 110. In this embodiment, the retainer 34 is encircled by an adjustment grip 114. The adjustment grip 114 provides an undulating series of crests 113 and troughs 115. The troughs 115 are adapted to provide convenient finger holds for an operator. In one embodiment, 6 crests 113 and 6 troughs 115 are provided. An alternative number of crests 113 and troughs 115 may be provided.

Figure 9:
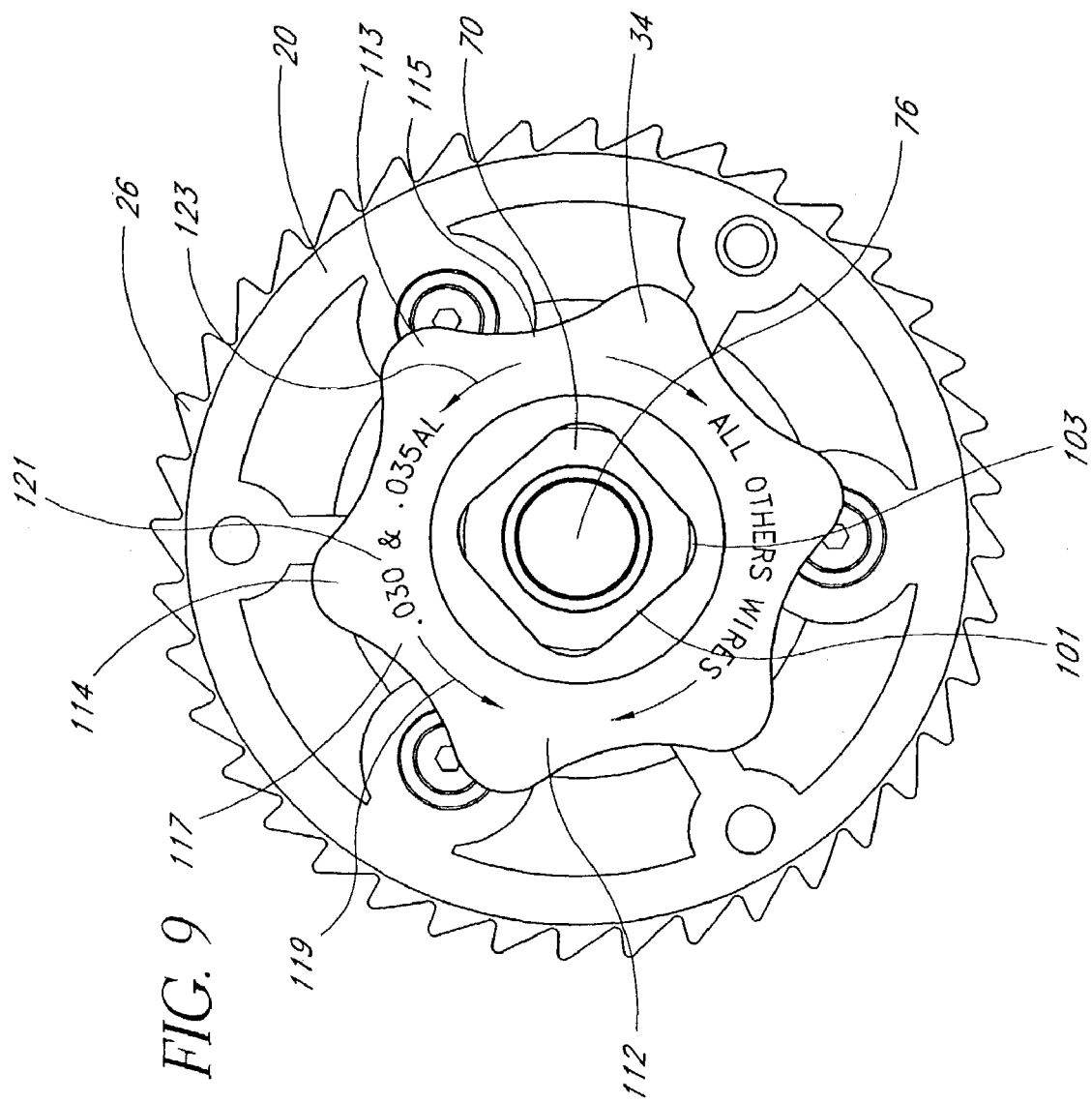
FIG. 9 illustrates an advantageous embodiment in which a detached retainer is in a position to function as a tension knob adjustment tool.

FIG. 9 illustrates the retainer 34 in the position it assumes when performing one function as a tension knob adjustment tool 110. The outer shape of the tension knob 70 and the inner shape of the tension knob adjustment tool 110, as illustrated, are configured such that the inner surface of the tension knob adjustment tool 110 snugly receives and surrounds the outer surface of the tension knob 70. In one embodiment, the internal dimensions of the tension knob adjustment tool 110 are slightly larger than the external dimensions of the gripping portion 97 of the tension knob 70. That is, the tension knob adjustment tool 110 provides a cutout that receives a polygonal shape with 4 major sides and 4 minor sides with dimensions as described in relation to the gripping portion 97 of the tension knob 70. In the embodiment described, the outer shape of the tension knob 70 is similar to the shape of a hex nut (though more than 6 sides are provided). Other shapes may be employed that allow the tension knob 70 to be received snugly into the tension knob adjustment tool 110 and are within the scope of this inventive aspect.

Advantageously, the tension knob adjustment tool 110 provides adjustment indicia 117 indicating the direction that an operator should rotate the tension knob adjustment tool 110 in order to achieve the desired setting. In one embodiment, the tension knob adjustment tool 110 is rotated counter-clockwise for a setting appropriate for small diameter aluminum wires, such as those that are up to 0.035" in diameter, and is rotated clockwise for a setting appropriate for other wires. Alternatively, the rotational resistance assembly 82 may be configured such that these directions of rotation are reversed. In either case, the adjustment indicia 117 indicates the correct direction to rotate the tension knob 70. In the embodiment illustrated, the adjustment indicia 117 comprise a left arrow 119 pointing toward the correct rotational direction, a label 121 indicating the type of wire that is to be loaded onto the welding wire support assembly 10, and a right arrow 123 pointing toward the correct rotational direction. This double arrow arrangement, as described, is not necessary for this inventive aspect. Alternatively, a single arrow can be used. Furthermore, the label 121 can alternatively indicate a value of rotational resistance instead of a wire type. Any arrangement for indicating the direction that the tension knob 70 should be rotated to achieve a desired setting is within the scope of this inventive aspect.

Advantageously, the adjustment indicia 117 is displayed on a convenient side of the retainer 34. In one embodiment, shown in FIG. 9, the adjustment indicia 117 is displayed on the side that is most visible to the operator when the operator is making an adjustment. In this embodiment, the adjustment indicia 117 is not displayed on the opposite side of the retainer 34. This embodiment aids the operator in determining which side of the retainer 34 should be used for making adjustments, because the adjustment indicia 117 should be visible when the retainer 34 is properly aligned to be used as an adjustment tool. Alternatively, indicia may be provided on the opposite side, or on both sides.

Advantageously, the tension knob adjustment tool 110 is integrally formed into the welding wire support assembly 10. An operator of a welding device may not have convenient access to non-integral adjustment tools. Furthemore, non-integral adjustment tools may become lost. Thus, it is particularly advantageous that the tension knob adjustment tool 110 of a preferred embodiment is integrally formed into a portion of the welding wire support assembly 10 that is normally expected to be present during welding operations. A welder is not likely to lose the retainer 34 because it is advantageous to operate the welding device with the retainer 34 attached, such that the wire does not fall off the body 6. Alternatively, the integral adjustment tool 110 may be formed into another component of the welding wire support assembly 10.

One Method of Adjusting Rotational Resistance

One of ordinary skill in the art will appreciate that the apparatus described above enables new and useful methods of operating a welding device. For example, an operator may quickly and effectively change rotational resistance settings when wire types or wire sizes change. When an operator decides to change wire sizes or types, he or she may remove the retainer 34. Then, the operator removes the wire from the body 6. Then, the operator places a new wire on the body 6. The operator uses the tension knob adjustment tool 110 to rotate the tension knob 70 in a desired direction. The operator detects the correct setting by noticing the change in position of the cam 68. The operator replaces the retainer 34.

The Above Embodiments are Exemplary Only

The foregoing describes various illustrative embodiments of a welding wire dispensing assembly and apparatus for providing adjustment of rotational resistance in a spool. While various embodiments are described in detail, one of ordinary skill in the art will appreciate that the principles of the invention described herein are applicable to additional alternative embodiments. Thus, those additional alternative embodiments that apply the principles of the invention as described herein are within the scope of the invention to the extent they are within the Claims.

What is claimed is:

1. A welding wire dispensing assembly, comprising:
   a frame,
   a spool support rotatably mounted to said frame having a first end and a second end, said spool support defining between said first end and said second end a surface around which a wire spool can be mounted;
   an axle assembly, comprising:
      an axle,
      a first friction member defining a first friction surface;
   a resistance adjustment assembly, comprising:
      a second friction member defining a second friction surface, one of said first friction surface and said second friction surface substantially fixed with respect to one of said spool support and said axle;
      a force actuator having a first adjustment surface,
      said force actuator having a first position in which said actuator exerts a first level of interface force on one of said first friction member and second friction member creating a first level of friction force between said first friction surface and said second friction surface;
      said force actuator having a second position in which said actuator exerts a second level of interface force on one of said first friction member and second friction member creating a second level of friction force between said first friction surface and said second friction surface;
      a cam mechanism comprising a cam channel and a cam follower, said cam follower movable between a first stop and a second stop, wherein movement of said cam follower to a first location in said cam channel causes said cam mechanism to at least indirectly exert a force on said force actuator to move said force actuator to said first position, and wherein movement of said cam follower to a second location in said cam channel causes said cam mechanism to at least indirectly exert a force on said force actuator to move said force actuator to said second position.

2. The welding wire dispensing assembly of claim 1, wherein the welding wire dispensing assembly is a welding cabinet.

3. The welding wire dispensing assembly of claim 1, wherein at least one of said force actuator and said cam mechanism prevent said force actuator from moving in at least one direction beyond said first position and at least one of said force actuator and said cam mechanism prevent said force actuator from moving in at least one direction beyond said second position.

4. The welding wire dispensing assembly of claim 1, wherein said cam follower is movable in opposite directions to move said force actuator between said first position and said second position.

5. The welding wire dispensing assembly of claim 1, wherein said first level of friction force is greater than said second level of friction force.

6. The welding wire dispensing assembly of claim 1, further comprising a spool retainer releasably securable to said first end of said spool support, said spool retainer having a surface configured to cooperate with said spool support to prevent a spool from sliding off said first end of said spool support.

7. The welding wire dispensing assembly of claim 6, further comprising a spool retainer releasably securable to said first end of said spool support, said spool retainer having a surface configured to cooperate with said spool support to prevent a spool from sliding off said first end of said spool support, said spool retainer further defining a gripping surface configured to at least indirectly exert force on said cam mechanism to move said cam follower so that said cam mechanism at least indirectly causes the movement of said force actuator between said first position and said second position.

8. The welding wire dispensing assembly of claim 7, wherein said retainer further defines a finger gripping surface configured to facilitate rotation of said retainer by fingers of a user.

9. The welding wire dispensing assembly of claim 8, wherein said retainer further comprises visual indicia indicating the direction said retainer is to be moved to obtain the desired level of resistance when a spool of a given type of wire is mounted on said spool support.

10. A welding wire dispensing assembly, comprising:
   a frame,
   a spool support rotatably mounted to said frame having a first end and a second end, said spool support defining between said first end and said second end a surface around which a wire spool can be mounted;
   an axle assembly, comprising:
      an axle,
      a first friction member defining a first friction surface;
   a resistance adjustment assembly, comprising:
      a second friction member defining a second friction surface, one of said first friction surface and said second friction surface substantially fixed with respect to one of said spool support and said axle;

a force actuator having a first adjustment surface,
said force actuator having a first position in which said actuator exerts a first level of interface force on one of said first friction member and second friction member creating a first level of friction force between said first friction surface and said second friction surface;
said force actuator having a second position in which said actuator exerts a second level of interface force on one of said first friction member and second friction member creating a second level of friction force between said first friction surface and said second friction surface;
a control defining a second adjustment surface, said force actuator movable between said first position and said second position in response to interaction between said first adjustment surface and said second adjustment surface, wherein movement of said force actuator in at least one direction from said first position is subject to greater resistance than movement in said at least one direction toward said first position and wherein movement of said force actuator in at least one direction from said second position is subject to greater resistance than movement in said at least one direction toward said second position.

11. The welding wire dispensing assembly of claim 10, wherein at least one of said force actuator and said control prevent said force actuator from moving in at least one direction beyond said first position and at least one of said force actuator and said control prevent said force actuator from moving in at least one direction beyond said second position.

12. The welding wire dispensing assembly of claim 10, wherein said control is movable in opposite directions to move said force actuator between said first position and said second position.

13. The welding wire dispensing assembly of claim 10, wherein said first level of friction force is greater than said second level of friction force.

14. The welding wire dispensing assembly of claim 10, further comprising a spool retainer releasably securable to said first end of said spool support, said spool retainer having a surface configured to cooperate with said spool support to prevent a spool from sliding off said first end of said spool support.

15. The welding wire dispensing assembly of claim 10, wherein said control defines a manipulation surface configured to be gripped to move said control so that said first adjustment surface and said second adjustment surface interact to move said force actuator between said first position and said second position.

16. The welding wire dispensing assembly of claim 15, further comprising a spool retainer releasably securable to said first end of said spool support, said spool retainer having a surface configured to cooperate with said spool support to prevent a spool from sliding off said first end of said spool support, said spool retainer further defining a gripping surface configured to exert force on said manipulation surface of said control to move said control so that said first adjustment surface and said second adjustment surface interact to move said force actuator between said first position and said second position.

17. The welding wire dispensing assembly of claim 16, wherein said retainer further defines a finger gripping surface configured to facilitate rotation of said retainer by fingers of a user.

18. The welding wire dispensing assembly of claim 17, wherein said retainer further comprises visual indicia indicating the direction said retainer is to be moved to obtain the desired level of resistance when a spool of a given type of wire is mounted on said spool support.

19. The welding wire dispensing assembly of claim 18, wherein one of said force actuator and said control defines a cam surface which cooperates with a cam follower on the other of said force actuator and said control to move said force actuator from one of said first position and said second position to the other of said first position and said second position.

20. A welding wire dispensing assembly, comprising:
a frame,
a spool support rotatably mounted to said frame having a first end and a second end, said spool support defining between said first end and said second end a surface around which a wire spool can be mounted;
a resistance adjustment assembly, comprising:
a force actuator having a first adjustment surface,
said force actuator having a first position configured to cause a first level of resistance;
said force actuator having a second position configured to cause a second level of resistance;
a spool retainer releasably securable to said first end of said spool support, said spool retainer having a surface configured to cooperate with said spool support to prevent a spool from sliding off said first end of said spool support, said spool retainer further defining a gripping surface configured to interact at least indirectly with said first adjustment surface of said force actuator to cause said force actuator to assume one of said first position and said second position.

21. The welding wire dispensing assembly of claim 20, wherein said spool retainer further provides a first mode of operation to cause said force actuator to assume said first position and second mode of operation to cause said force actuator to assume said second position.

22. The welding wire dispensing assembly of claim 21, wherein said spool retainer further provides visual indicia illustrating said first mode of operation and said second mode of operation.

23. The welding wire dispensing assembly of claim 21, wherein said first mode of operation is rotating said spool retainer in one of a clockwise direction and of a counter-clockwise direction, and wherein said second mode of operation is rotating said spool retainer in the other of a clockwise direction and a counter-clockwise direction.

24. A welding wire dispensing assembly, comprising:
a frame,
a spool support rotatably mounted to said frame having a first end and a second end, said spool support defining between said first end and said second end a surface around which a wire spool can be mounted;
a resistance adjustment assembly, comprising:
a force actuator having a first adjustment surface,
said force actuator having a first position configured to cause a first level of resistance;
said force actuator having a second position configured to cause a second level of resistance;
a tool defining a gripping surface configured to interact at least indirectly with said first adjustment surface of said force actuator to cause said force actuator to assume one of said first position and said second position, said tool rotatable in one direction to cause said force actuator to assume said first position and said tool rotatable in an opposite direction to cause said force actuator to assume said second position, said tool including visual indicia indicating the direction said tool is to be moved to obtain the desired level of resistance when a spool of a given type and size of wire is mounted on said spool support.

25. The welding wire dispensing assembly of claim 24, wherein the tool is integrally formed into a component of said welding wire dispensing assembly.

26. The welding wire dispensing assembly of claim 24, wherein the tool is attached to a component of said welding wire dispensing assembly.

* * * * *